Oct. 26, 1954   F. W. McRAE, JR   2,692,784
HINGED STRUT LOCK

Filed Jan. 21, 1953   3 Sheets-Sheet 1

INVENTOR.
FORBES W. McRAE, JR
BY
Reynolds, Beach & Christensen
ATTORNEYS

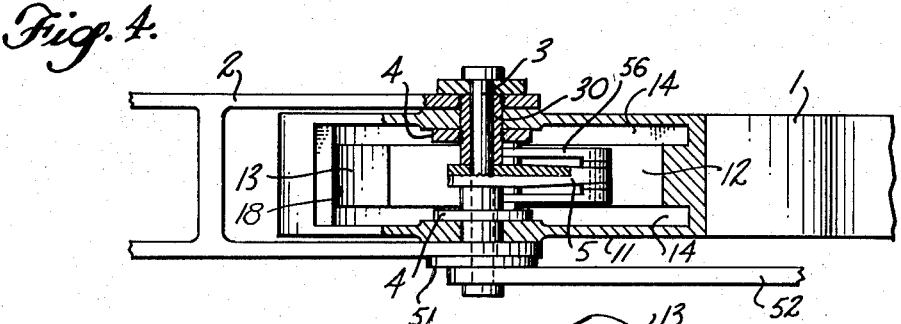
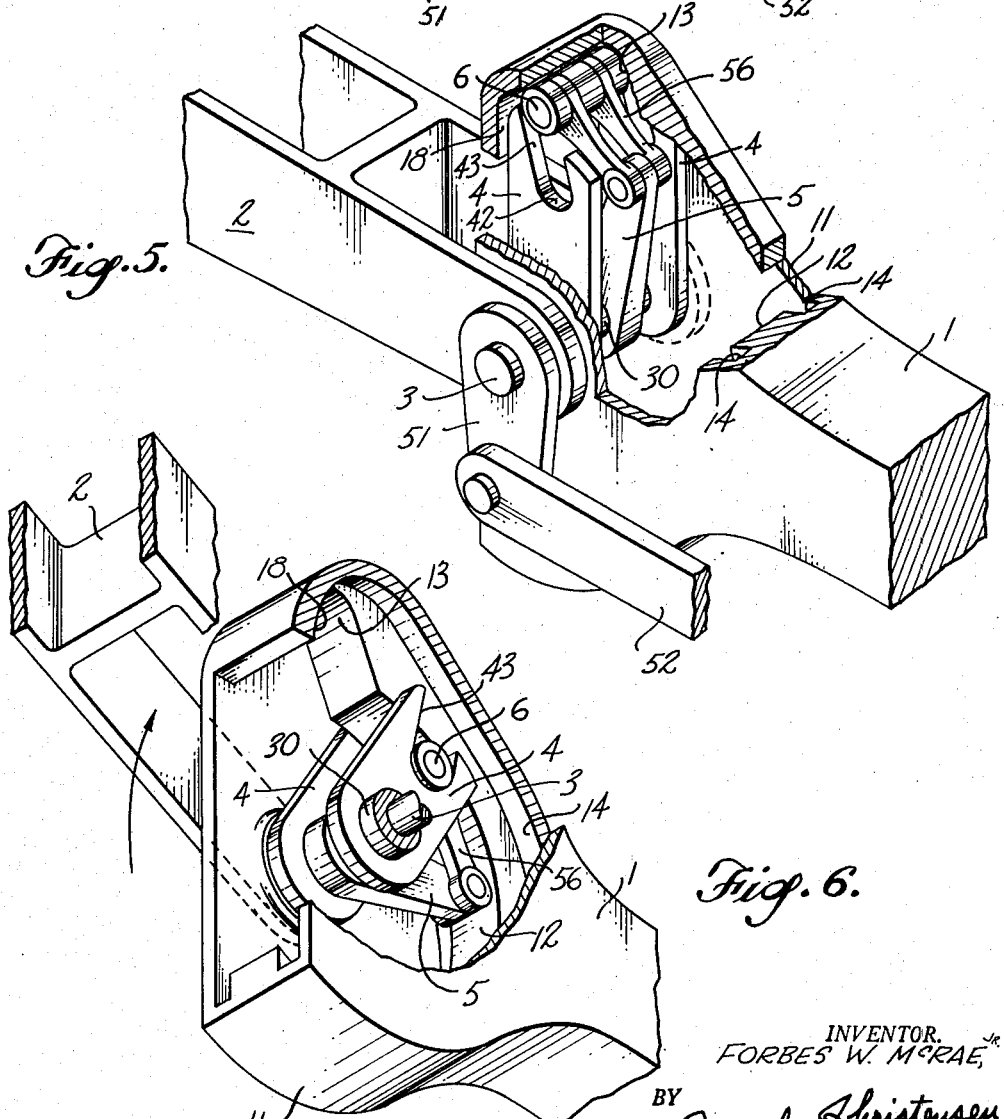

Oct. 26, 1954   F. W. McRAE, JR   2,692,784
HINGED STRUT LOCK
Filed Jan. 21, 1953   3 Sheets-Sheet 3
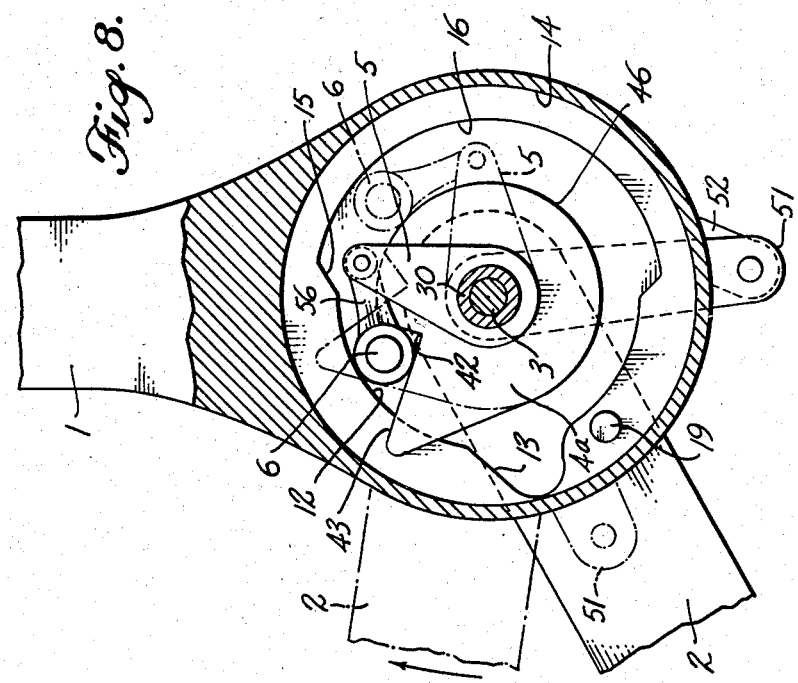
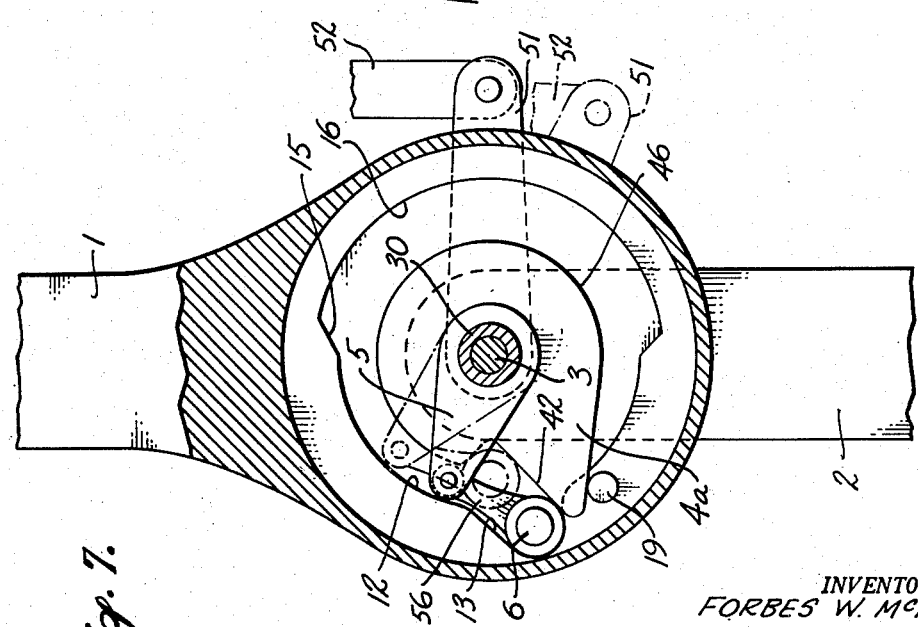
INVENTOR.
FORBES W. McRAE, Jr.
BY Reynolds, Beach & Christensen
ATTORNEYS Patented Oct. 26, 1954

2,692,784

UNITED STATES PATENT OFFICE 2,692,784

HINGED STRUT LOCK

Forbes W. McRae, Jr., Seattle, Wash., assignor to Boeing Airplane Company, Seattle, Wash., a corporation of Delaware Application January 21, 1953, Serial No. 332,165

7 Claims. (Cl. 287—99)

Struts used in aircraft mechanisms to brace a movable part from a fixed part, for example to brace a landing leg in extended position from the airframe, for the sake of safety must be locked in the extended position, in order to prevent unintentional folding movement of the strut. When it is to be folded or retracted, the lock must first be released, and sometimes, though not necessarily, continued movement of the releasing means accomplishes or accompanies retraction of the strut. The present invention relates to such a folding strut and a lock and releasing means therefor, and has for its general object the provision of simple, yet positive, mechanical means, whereby such a strut may be positively locked in its extended position, and the lock may be readily unlocked for movement of the strut part into folded position, by or accompanied by continued movement of the release means in the releasing sense, and locking may be accomplished by the reverse movement of parts, the whole being arranged in a compact, simple design, and capable of being actuated by a device such as a simple push-pull rod or its equivalent.

Often such mechanism has further mechanism associated with it, operable in a given sequence. For example, a retractable landing leg and its bracing strut, when wholly retracted, are housed in by a closable door, which completes the streamline surface of the skin, and it is required to energize an actuator to close this door as soon as, but not before, the landing gear and its strut reach their retracted or folded position. It is a further object of the present invention to provide mechanism which will, at the appropriate time, free certain parts of the locking means for further and independent movement for such a purpose as the energization of an actuator to close such a door, for example.

In the accompanying drawings the invention is shown embodied in two forms of mechanism, one of which incorporates the secondary feature mentioned above, and the other of which does not.

Figure 4 is an axial sectional view, taken primarily on the line 4—4 of Figure 3.

Figure 5 is an isometric view, with housing parts broken away, illustrating the mechanism in the locked position corresponding to Figure 1, and Figure 6 is another isometric view with parts broken away, and illustrated in the position corresponding to Figure 3.

Figure 1:
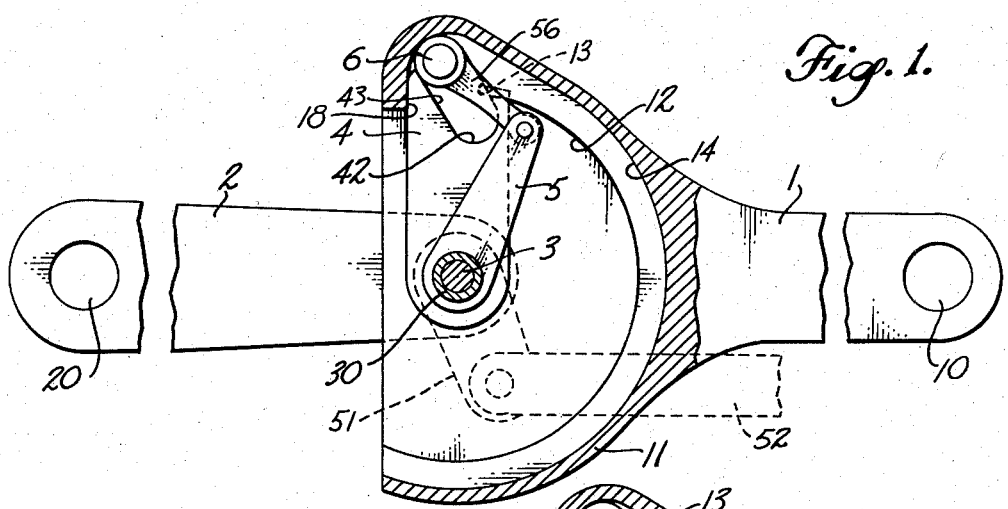
Figure 1 is a side elevational view, with parts broken away, illustrating parts in the locked position.
Figure 3:
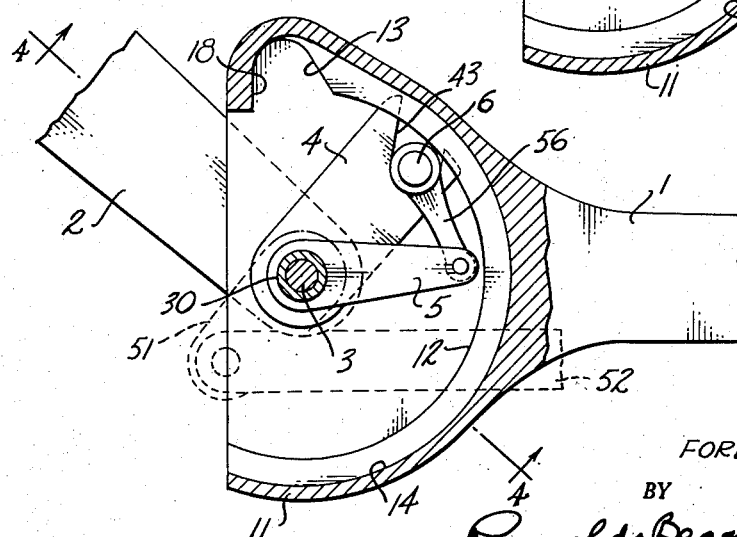
Figure 3 is a similar view showing parts further moved towards or in their folded position.

Figure 7 is a view similar to Figure 1, but showing a modified structure, with parts shown in full lines in the locked position, and in dash lines in the unlocked position; and Figure 8 is a view similar to Figure 3, showing the same modification but with the strut parts in the folded position, and with the locking pin and its actuating means moved beyond folded or retracted position of the strut, for actuation of further mechanism.

The strut as a whole may be considered to comprise two legs, hingedly connected to swing about their common hinge axis between extended and folded positions. The first leg 1 may be assumed to be a fixed leg, although it too may swing about a fixed pin fitting at 10, and the second leg 2 may be assumed to be a swingable leg, hingedly connected to a movable element which is to be braced, by a pin fitting at 20. The hinge axis is defined in part by a hinge bolt 3 and in part by a sleeve 30 surrounding the pin 3. The pin 3 is freely rotative within the sleeve 30, and the only elements connected to the pin 3 are an arm 5 and an actuating lever 51. This arm 5 will be designated hereafter the "first arm," and an arm 4, which is secured to the sleeve 30, is hereafter designated the "second arm." This latter or second arm 4 preferably is split, that is to say, it is formed in two parts, one lying at one side of the first arm 5 and the other lying at the opposite side thereof. If the second leg 2 is also secured to the sleeve 30, as preferably it is, then in effect the second arm 4 is operatively secured for rotation to the second leg 2, and the two rotate always conjointly. However, the first arm 5 is rotative wholly independently of the first leg 1, except when parts are locked together, as will shortly appear.

The first leg 1 is conveniently, although not necessarily, formed with a housing 11, which embraces the hinge axis and the parts associated therewith, including the first arm 5 and the second arm 4, and interiorly this housing supports or is formed with a cam surface 12, which is in general concentrically disposed about the hinge axis, and which is straddled by the two halves of the arm 4. At one terminus, however, the cam surface 12 is formed with a shoulder 13, which is inclined with relation to (usually outwardly of) the concentric portion 12 of the cam. The outer or swinging end of the second arm 4 is likewise formed with a shoulder 43, spaced from, facing towards, and paralleling the shoulder 13, to define a locking recess between the two (see Figures 1 and 2), when parts are in the locked position with rotation of the arm 4 and leg 2 stopped by engagement of arm 4 with the abutment 18. The shoulders 13 and 43 of the locking recess are not in the same plane, it will be understood, but are in offset planes, whereby a locking element may be located between them, to prevent relative movement of the shouldered parts 11 and 4. The housing is interiorly grooved at each side of the cam surface 12 to define grooves 14 for the reception of the projecting outer ends of the two parts of the second arm 4. The shoulder 43 terminates at its inner end in a ledge 42.

The locking is accomplished by projecting a locking element of suitable form between the facing shoulders 13 and 43, directed transversely of the direction of their relative movement. A simple transverse pin would accomplish this function, and in effect this is what is shown at 6, although it may mount rollers whereby it will move more readily over the surfaces it contacts during movements within and between its locking and unlocked positions. Also, its movement must be controlled from the arm 5, as by the push-pull links 56, the connection whereof to the locking element interrupts its surface shape. It will be convenient to refer as a whole to this locking element hereinafter as a locking pin, notwithstanding the extraneous elements associated with it. When this locking pin 6 is drawn inwardly from the locking position of Figures 1 and 5, to the position of Figure 2, it will seat upon the ledge 42, and when so seated is withdrawn radially inwardly sufficiently that it may pass just inside the cam surface 12, during its angular movement about the hinge bolt 3. Such angular movement, in each sense, is effected by the first arm 5, through the links 56 already mentioned.

Figure 2:
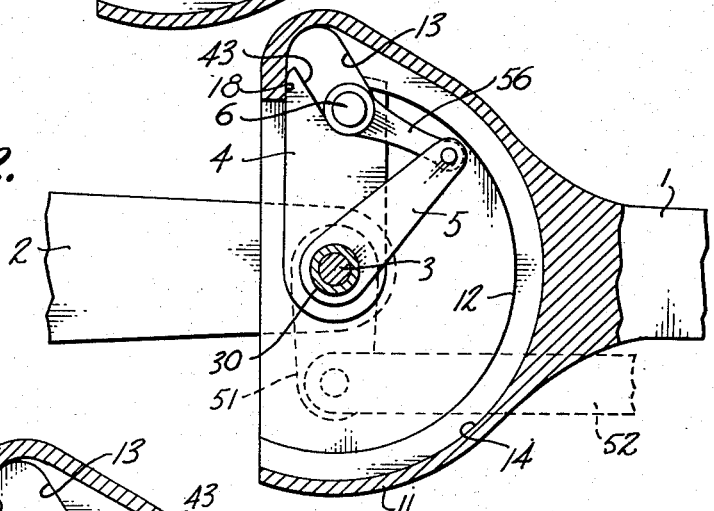
Figure 2 is a similar view showing parts in the unlocked position, but with the strut legs as yet in their fully extended positions.

Exteriorly of the housing 11 the hinge pin 3 receives an actuating lever 51 which may be connected by a link 52 or other similar connection for push-pull operation, whereby the first arm 5 and its entrained locking pin 6 may be rotated about the hinge axis, and the locking pin moved from the locking position of Figure 1 to the unlocked position of Figure 2, and thence to or towards the folded position, as shown in Figure 3, and vice versa.

With parts in the locked position of Figure 1, clockwise rotation of the first arm 5 will withdraw the locking pin 6 from the locking recess and seat it upon the ledge 42, where it lies within the cam surface 12. This much rotation of the first arm 5 will not in itself cause any relative hinging movement of the legs 1 and 2; however, further clockwise rotation of the arm 5 will accompany, or can be made to cause, hinging movement of the second leg 2 relative to the first leg 1 from the position of Figure 2 to a position such as is shown in Figure 3. Obviously, counterclockwise rotation of the arm 5 from the position of Figure 3 to that of Figure 1 will accompany or cause extending of the leg 2 to extended position, until arm 4 engages abutment 18, and finally will effect locking of parts in extended position when the locking pin 6 enters the locking recess between opposed shoulders 13 and 43.

In this form the rotation of the arm 5 can entrain rotation of the arm 4 in either rotative sense, at least, until its counterclockwise movement is halted by abutment 18, for in effect the outer or swinging end of the arm 4 is notched. However, rotation of the arm 4 and leg 2 can be effected by another actuator, not shown, in which case the arm 5 merely follows movement of arm 4.

In the form shown in Figures 7 and 8 the construction is substantially the same as that already described, except that the arm 4a is enlarged at its base, and the concentric cam surface 12 is interrupted and offset radially outwardly at 15, at a point spaced from the shoulder 13 by a distance sufficient to accomplish completion of the folding operation. When the inwardly retracted locking pin 6 reaches the offset 15, moving clockwise from the position of Figure 7 to that of Figure 8, it will be evident that the locking pin, which during such clockwise movement has been held in by the concentric cam surface 12, may escape from engagement with the ledge 42 and move outwardly again to ride along the enlarged concentric surface 16 and over the concentric surface 46, which is part of the arm 4a. At this time the clockwise movement of the arm 4a and its associated parts will ordinarily cease, and yet the arm 5 may continue its rotation, carrying with it the locking pin 6, as is shown in dash lines in Figure 8, and this further movement of the arm 5 may be employed to effect actuation of some further mechanism, such, for example, as an actuator for a door-closing jack or the like (not shown), which thus is not allowed to come into operation until the folding operation of the strut has been completed. During extension, counterclockwise rotation of arm 4a is halted by contact with the abutment or stop pin 19, and when so halted further counterclockwise rotation of arm 5 will effect locking, in the manner already described.

I claim as my invention:

1. In combination with a strut which includes a first and a second leg hingedly connected to swing about their hinge axis between extended and folded positions, means to lock the strut in extended position comprising a cam fixed to the first leg and having a cam surface concentric with and spaced from the hinge axis, but terminating at one end in a shouldered portion directed transversely of its concentric portion, a first arm mounted for rotation about said hinge axis, means independent of either leg, operatively connected to said first arm to rotate the latter, a second arm fixedly connected to the second leg, to swing with the latter about the hinge axis relative to the first leg, and formed with a shoulder which when parts are in extended position faces and parallels the cam's shoulder to define between the two shoulders a locking recess, the second arm's shoulder terminating at one end in a ledge, a locking pin of a size to fill such locking recess when unseated from said ledge, and so to lock the legs against relative movement, and of such size that when withdrawn from such locking recess and seated on said ledge it will unlock the legs, and may rotate along the concentric portion of said cam surface to allow rotation of said second arm and leg relative to the first leg, and means interconnecting said first arm and said locking pin to shift the latter between locking position within said locking recess, and unlocked position, by rotation of said first arm.

2. Strut locking means as in claim 1, including a housing formed on the first leg, and enclosing said cam, said first and second arms, and said locking pin, in all relative positions of the two legs.

3. Strut locking means as in claim 1, wherein the shouldered portion of the second arm is inclined outwardly and forwardly with respect to the rotational sense of locking movement of the locking pin, whereby the latter will slide therealong into and from locking position, and further characterized in that the means interconnecting the first arm and the locking pin is formed as a link directed generally chordally of the direction of rotation.

4. Strut locking means as in claim 1, wherein the second arm is notched inwardly from its swinging end, one side of said notch constituting its locking shoulder, its opposite side generally coinciding with but lying in a plane offset from the cam's shouldered portion, and its bottom constituting the terminal ledge.

5. Strut locking means as in claim 1, wherein the cam surface, at a point spaced angularly from its locking shoulder, is radially offset, to allow shifting of the locking pin in a radial direction from engagement with its terminal ledge, and so to permit continued rotation of the locking pin and first arm independently of the second arm.

6. In combination with a strut which includes a first and a second leg hingedly connected to swing about their hinge axis between extended and folded positions, a housing formed on the first leg, embracing the hinge axis and formed interiorly with a cam surface generally concentric with the hinge axis, located intermediate two grooves of larger radius, and terminating in an outwardly inclined shoulder, a first arm mounted in the plane of said cam surface for rotation about the hinge axis, means independent of either leg, located exteriorly of the housing, and operatively connected to said first arm to rotate the latter, a split second arm fixedly connected to the second leg, and located in the planes of the two grooves, to swing with the second leg about the hinge axis, said second arm being formed with a shoulder which when parts are in extended position faces and parallels the cam's shoulder, although in offset planes, to define between them a locking recess, a locking pin of a diameter and length to fill such locking recess when urged outwardly of the cam's concentric surface, and so to lock the legs against relative movement, or to lie within such concentric surface when drawn inwardly and so to unlock the legs, and a link interconnecting said locking pin and said first arm for movement of the locking pin into and from locking position under the influence of rotational movement of the first arm, independently of the second arm and the two legs.

7. Strut locking mechanism as in claim 6, wherein the second arm is formed at the inner end of its shoulder with a ledge limiting inward movement of the locking pin and spaced inwardly from the concentric portion of the cam sufficiently to allow the locking pin to rotate within the cam, and characterized in that the cam's concentric portion is offset radially outwardly sufficiently to release the locking pin from said ledge, at a location angularly spaced from the locked position, and so to free the first arm for continued rotative movement independently of the two legs.

References Cited in the file of this patent

UNITED STATES PATENTS

| Number | Name | Date |
| --- | --- | --- |
| 2,359,554 | Griswold | Oct. 3, 1944 |
| 2,363,667 | Griswold | Nov. 28, 1944 |
| 2,525,244 | Straussler | Oct. 10, 1950 |